United States Patent
Ushiyama et al.

(10) Patent No.: US 12,109,812 B2
(45) Date of Patent: Oct. 8, 2024

(54) INK JET PRINTING METHOD AND INK JET PRINTING APPARATUS

(71) Applicant: Seiko Epson Corporation, Tokyo (JP)

(72) Inventors: Tomoyuki Ushiyama, Chino (JP); Kei Hiruma, Chino (JP); Hiroaki Kida, Shiojiri (JP); Shintaro Asai, Matsumoto (JP); Masaru Terada, Suwa (JP); Mitsunobu Nakatani, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 156 days.

(21) Appl. No.: 17/389,528

(22) Filed: Jul. 30, 2021

(65) Prior Publication Data
US 2022/0032618 A1 Feb. 3, 2022

(30) Foreign Application Priority Data

Jul. 31, 2020 (JP) .................. 2020-130206

(51) Int. Cl.
*B41J 2/05* (2006.01)
*C09D 11/322* (2014.01)
*B41J 2/15* (2006.01)

(52) U.S. Cl.
CPC ............... *B41J 2/05* (2013.01); *C09D 11/322* (2013.01); *B41J 2/15* (2013.01)

(58) Field of Classification Search
CPC .... C09D 11/322; C09D 17/006; B41J 2/2107; B41J 11/00216; B41J 2/15; B41M 5/0023; B41M 1/22; B41M 7/009
See application file for complete search history.

(56) References Cited

U.S. PATENT DOCUMENTS

| | | | |
|---|---|---|---|
| 7,682,013 B2* | 3/2010 | Hoshino | B41J 11/00214 385/115 |
| 7,810,920 B2 | 10/2010 | Matsuhashi et al. | |
| 8,613,512 B2 | 12/2013 | Matsuhashi et al. | |
| 9,168,764 B2* | 10/2015 | Mitsuzawa | B41J 2/145 |
| 9,522,532 B2* | 12/2016 | Yoneyama | C09D 11/322 |
| 9,855,769 B2* | 1/2018 | Perez Gellida | B41J 11/00222 |
| 2002/0044188 A1* | 4/2002 | Codos | D06P 5/30 347/106 |

(Continued)

FOREIGN PATENT DOCUMENTS

| | | |
|---|---|---|
| CN | 101701115 A | 5/2010 |
| JP | 2006-272731 A | 10/2006 |

(Continued)

*Primary Examiner* — John Zimmermann
(74) *Attorney, Agent, or Firm* — Harness, Dickey & Pierce, P.L.C.

(57) ABSTRACT

An ink jet printing method includes a metallic ink application step of ejecting a metallic ink composition containing a metallic pigment from an ink jet head to apply the metallic ink composition onto a printing medium, a heating step of heating the metallic ink composition applied on the printing medium with an infrared heater, and a coloring ink application step of ejecting a coloring ink composition containing a coloring material from an ink jet head to apply the coloring ink composition onto the metallic ink composition on the printing medium. Each of the metallic ink composition and the coloring ink composition is a water-based ink or a solvent-based ink.

13 Claims, 1 Drawing Sheet

(56) References Cited

U.S. PATENT DOCUMENTS

| | | |
|---|---|---|
| 2006/0238591 A1 | 10/2006 | Matsuhashi et al. |
| 2008/0182085 A1 | 7/2008 | Oyanagi et al. |
| 2010/0009136 A1 | 1/2010 | Oyanagi et al. |
| 2011/0036266 A1 | 2/2011 | Oyanagi et al. |
| 2011/0037804 A1 | 2/2011 | Oyanagi et al. |
| 2011/0074857 A1* | 3/2011 | Mitsuzawa ........ B41J 11/00212 347/16 |
| 2011/0115862 A1 | 5/2011 | Matsuhashi et al. |
| 2012/0006224 A1 | 1/2012 | Oyanagi et al. |
| 2012/0162335 A1* | 6/2012 | Sasaki ..................... B41J 11/06 347/102 |
| 2012/0274715 A1 | 11/2012 | Oyanagi et al. |
| 2013/0027487 A1* | 1/2013 | Usuda .................. B41J 2/14274 347/102 |
| 2013/0044171 A1* | 2/2013 | Sasaki ............... B41J 11/00216 347/102 |
| 2015/0112003 A1* | 4/2015 | Toyoda ................ C09D 17/002 524/130 |
| 2015/0315397 A1* | 11/2015 | Toyoda ................ B41J 2/04573 347/100 |
| 2015/0344722 A1* | 12/2015 | Lin ....................... C09D 133/14 428/483 |
| 2017/0058138 A1* | 3/2017 | Kida .................... C09D 11/322 |
| 2019/0270900 A1* | 9/2019 | Nakamura ......... B41J 11/00216 |
| 2019/0300733 A1* | 10/2019 | Takiguchi .............. B41M 5/529 |
| 2020/0023648 A1* | 1/2020 | Gotou ...................... B41J 2/145 |
| 2021/0094313 A1* | 4/2021 | Kida .................... C09D 11/322 |
| 2021/0284856 A1* | 9/2021 | Takiguchi .............. C09D 11/36 |

FOREIGN PATENT DOCUMENTS

| | | |
|---|---|---|
| JP | 2010018651 A | 1/2010 |
| JP | 2013-256665 A | 12/2013 |
| JP | 2015-189775 A | 11/2015 |
| JP | 2019-167543 A | 10/2019 |
| JP | 2021-187089 A | 12/2021 |

* cited by examiner

INK JET PRINTING METHOD AND INK JET PRINTING APPARATUS

The present application is based on, and claims priority from JP Application Serial Number 2020-130206, filed Jul. 31, 2020, the disclosure of which is hereby incorporated by reference herein in its entirety.

BACKGROUND

1. Technical Field

The present disclosure relates to an ink jet printing method and an ink jet printing apparatus.

2. Related Art

Ink jet printing is a known method for printing images on printing media by ejecting minute ink droplets through the nozzles of the ink jet head of an ink jet printing apparatus. Ink jet printing methods are being actively developed, including those for printing glossy or lustrous images.

For example, JP-A-2013-256665 discloses an ink jet printing method using metallic and color inks to form color images with metallic luster or any other beautiful images.

Unfortunately, printing a metallic ink composition and a color ink composition one on the other on a printing medium can cause color mixing of the inks.

SUMMARY

An aspect of the present disclosure provides an ink jet printing method including a metallic ink application step of ejecting a metallic ink composition containing a metallic pigment from an ink jet head to apply the metallic ink composition onto a printing medium, a heating step of heating the metallic ink composition applied on the printing medium with an infrared heater, and an coloring ink application step of ejecting a coloring ink composition containing a coloring material from an ink jet head to apply the coloring ink composition onto the metallic ink composition on the printing medium. Each of the metallic ink composition and the coloring ink composition is a water-based ink or a solvent-based ink.

Another aspect of the present disclosure provides an ink jet printing apparatus for the above-described ink jet printing method. The ink jet printing apparatus includes an ink jet head configured to eject the metallic ink composition, an infrared heater, and an ink jet head configured to eject the coloring ink composition.

DESCRIPTION OF EXEMPLARY EMBODIMENTS

Figure 1:
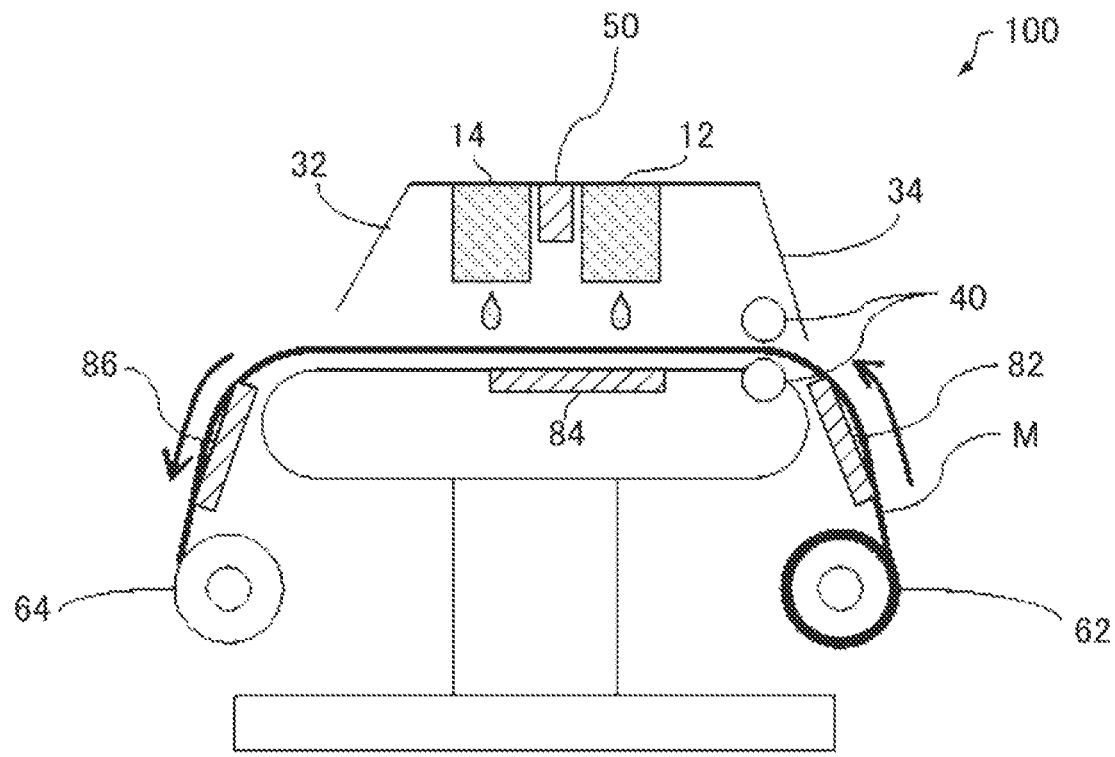
FIG. 1 is a schematic sectional view of an ink jet printing apparatus according to an embodiment of the present disclosure.

Some embodiments of the present disclosure will now be described. The following embodiments are implementations of the present disclosure. The implementations of the concept of the present disclosure are not limited to the following embodiments, and various modifications may be made within the scope and spirit of the disclosure. Not all of the components or members disclosed in the following embodiments are essential structures of the present disclosure.

1. Ink Jet Printing Method

The ink jet printing method disclosed herein includes a metallic ink application step, a heating step, and a coloring ink application step.

1.1. Metallic Ink Application Step

In the metallic ink application step, a metallic ink composition containing a metallic pigment is ejected onto a printing medium from an ink jet head.

1.1.1. Metallic Ink Composition

The metallic ink composition contains a metallic pigment.

(1) Metallic Pigment

The metallic pigment is not limited as long as it can form images with metallic luster. The particles of the metallic pigment may be, but are not limited to, flaky, spherical, or columnar. In some embodiments, the metallic pigment particles are flaky from the viewpoint of efficiently developing metallic luster.

A flaky particle refers to a particle having a substantially flat surface (X-Y plane) and a substantially uniform thickness (Z). The flaky particles can be formed by crushing or pulverizing a vapor-deposited metal film into metal particles with flat surfaces and uniform thicknesses. The dimensions of such a flaky particle can be defined by the long diameter X on the flat surface, the short diameter Y on the flat surface, and the thickness Z.

The material of the metallic pigment can be an elemental metal, such as aluminum, silver, gold, platinum, nickel, chromium, tin, zinc, indium, titanium, or copper, or an alloy of such metals. In some embodiments, aluminum or an aluminum alloy may be used in view of cost and metallic luster development. The other metal or nonmetal elements forming the aluminum alloy include, but not limited to, at least one of silver, gold, platinum, nickel, chromium, tin, zinc, indium, titanium, copper, alloys thereof, and mixtures thereof.

For producing the metallic pigment, for example, a composite pigment precursor is prepared by forming a release resin layer and a metal or alloy layer in this order on a base sheet. Then, the metal or alloy layer and the release resin layer are peeled together, with their interface maintained, from the base sheet and crushed or pulverized into flaky particles. The metal or alloy layer may be formed by vacuum vapor deposition, ion plating, or sputtering.

The thickness of the metal or alloy layer may be, for example, 10 nm to 100 nm. In some embodiments, the metal or alloy layer is formed to a thickness of 20 nm to 100 nm. The metal or alloy layer with a thickness in such a range exhibits high reflectivity and shininess and, accordingly, can be processed into a high-performance metallic pigment. In particular, the metal or alloy layer with a thickness of 100 nm or less can be formed into metallic pigment particles with a relatively low apparent specific gravity that can be stable in dispersions. Alternatively, the flaky metallic pigment particles may be formed to an average thickness in such a range. The average thickness of the metallic pigment can be measured, for example, as described below. A dilution of an ink or the like containing the metallic pigment is applied onto a substrate, followed by drying. The dried coating of the metallic pigment is measured by atomic force microscopy (AFM). Randomly selected 50 points are measured and averaged.

The volume average particle size of the metallic pigment may be, but is not limited to, 0.30 µm to 1.00 µm, for example, 0.30 µm to 0.90 µm or 0.35 µm to 0.80 µm. The volume average particle size used herein refers to the median diameter D50 in a volume size distribution of the particles in a dispersion measured by a laser diffraction/scattering method. The metallic pigment with a volume average particle size equal to or higher than the lower limit of the above ranges can produce highly reflective and shiny printed items. The metallic pigment with a volume average particle size lower than or equal to the upper limit of the above ranges can be stable in dispersions and increase the ejection consistency of the ink.

The release resin layer of the composite pigment precursor, which is the undercoat layer of the metal or alloy layer, helps the metal or alloy layer to peel from the base sheet. The release resin layer is made of, for example, polyvinyl alcohol, polyvinyl butyral, polyethylene glycol, polyacrylic acid, polyacrylamide, a cellulose derivative, polyvinyl butyral, an acrylic acid polymer, or a modified nylon resin.

The release resin layer can be formed by common coating techniques, such as gravure coating, roll coating, blade coating, extrusion coating, dip coating, or spin coating. After such coating and subsequent drying, the surface of the release resin layer may be planarized by calendering, if necessary.

The base sheet can be, but is not limited to, a polyester film, such as that of polytetrafluoroethylene, polyethylene, polypropylene, or polyethylene terephthalate; a polyamide film, such as that of nylon 66 or nylon 6; or any other releasable film such as that of polycarbonate, triacetate, or polyimide. In some embodiments, the base sheet is a polyethylene terephthalate or its copolymer film.

The metal or alloy layer may be provided with protective layers on both sides as disclosed in JP-A-2005-68250. The protective layers may be made of a metal, an alloy, a metal oxide, or an organic compound. The metal or alloy protective layer is made of a metal (or a semimetal) or an alloy, other than that of the pigment precursor. The metal oxide protective layer, which is made of a metal (or semimetal) oxide, may be formed by natural oxidation of the metal or alloy of the pigment precursor. For example, the metal oxide layer may be an alumina layer or a silicon oxide layer. A ceramic layer may be used. The organic protective layer may be a resin layer. The resin layer may be the remaining release resin layer or any other resin layer.

The silicon oxide layer, as the metal oxide protective layer, is not particularly limited, provided that the layer contains silicon oxide. For example, the silicon oxide protective layer can be formed of a silicon alkoxide, such as tetraalkoxysilane, or a polymer thereof by a sol-gel method. The silicon oxide layer can be formed, for example, by applying a solution of a silicon alkoxide or its polymer in an alcohol and heating and firing the coating of the solution.

Similarly, other metal oxide layers can be formed, for example, by applying a solution of a metal alkoxide or its polymer in an alcohol and heating and firing the coating of the solution.

The peeling from the base sheet may be performed in any manner without particular limitation. In some embodiments, the composite pigment precursor may be immersed in a liquid or subjected to ultrasonic treatment in a liquid to peel the composite pigment layer (the metal or alloy layer and the release resin layer) from the base sheet, followed by crushing or pulverizing the composite pigment layer into pigment particles.

The release resin layer of the individual ones of the flaky metallic pigment particles functions as a protective colloid to help the metallic pigment disperse favorably in a solvent to prepare a stable dispersion liquid.

In some embodiments using a water-based metallic ink composition, the metallic pigment is surface-treated to reduce the likelihood that the metal reacts with water or oxygen. As with the above, in some embodiments using a solvent-based metallic ink composition, the metallic pigment is surface-treated to reduce the likelihood that the metal reacts with oxygen or water.

The term "water-based ink" used herein refers to an ink containing at least water as a major one of the media in which the solid components dissolve or disperse. The media include water and organic solvents. The water-based ink contains 20% or more of water relative to the total mass of the ink. In some embodiments, the water content may be, by mass, 40% or more, 50% or more, or 60% or more.

The term "solvent-based ink" used herein refers to an ink containing one or more organic solvents as the major medium. The water content of the solvent-based ink is less than 20% relative to the total mass of the ink, that is, the solvent-based ink does not contain 20% by mass or more of water. In some embodiments using a solvent-based ink composition, the water content may be, by mass, 10% or less, 1% or less, or 0.1% or less. Also, the organic solvent content of the solvent-based ink composition may be 10% or more, for example, 40% or more, 50% or more, or 60% or more, relative to the total mass of the ink composition. In exemplary embodiments, the organic solvent content is 80% or more by mass.

In some embodiments, the metallic ink composition can be printed without being cured by irradiation with ultraviolet or any other radiation.

For surface-treating the metallic pigment, a fluorine compound or a silane compound may be used. Surface treatment with such a compound increases the metallic luster at the surfaces of the metallic pigment particles, helping form more lustrous images. The pigment particles to be surface-treated may or may not have the above-described protective layers.

For the surface treatment, for example, the metallic pigment particles may be brought into a reaction with a fluorine or silane compound with heating.

The fluorine compound may be a compound containing fluorine and at least one element selected from phosphorus, sulfur, and nitrogen, and examples of such fluorine compound include fluorophosphonic acid, fluorocarboxylic acids, fluorosulphonic acid, and salts thereof. Such fluorine compounds enable the phosphate, carboxy, or sulfo group to bind to the surfaces of the pigment particles to form coatings.

The molecular structure of the fluorine compound may include a perfluoroalkyl group ($C_nF2_{n+1}$) at at least a part of the structure, and the carbon number of the perfluoroalkyl group may be 1 to 6. Such a molecular structure is likely to increase the luster and the dispersibility of the metallic pigment and improve the weather resistance of printed images.

The fluorine compound may contain silicon. The present disclosure treats such a silicon-containing fluorine compound as one of the fluorine compounds used herein.

Examples of the fluorine compound include phosphorus-containing fluorine compounds, silicon-containing fluorine compounds, fluorine-containing fatty acids, and fluorine-containing isocyanates. In some embodiments, phosphorus-containing fluorine compounds and silicon-containing fluorine compounds are used because of their high luster.

Phosphorus-containing fluorine compounds contain a phosphorus-containing group and a fluorine-containing group. The perfluoroalkyl structure described later herein is one of the fluorine-containing groups. Phosphorus-containing groups include phosphate, phosphite, phosphonate, and phosphinate groups.

Silicon-containing fluorine compounds contain a silicon-containing group, described later herein, and a fluorine-containing group. The perfluoroalkyl structure described later herein is one of the fluorine-containing groups. Silicon-containing groups include alkoxysilyl groups. Silicon-containing fluorine compounds are useful in preparing a more lustrous and dispersible metallic pigment and improving the weather resistance of printed images.

Examples of silicon-containing fluorine compounds having perfluoroalkyl structures include, but are not limited to, $CF_3$—$CH_2CH_2$—$Si(OCH_3)_3$, $CF_3(CF_2)_3$—$CH_2CH$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, $CF_3(CF_2)_8$—$CH_2CH_2$—$Si(C_2H_5)(OC_2H_5)_2$, and 1H,1H,2H,2H-perfluorodecyltriethoxysilane.

The perfluoroalkyl structure may be a perfluoroalkyl ether structure ($C_nF_{2n+1}O$). Hence, a fluorine compound having a perfluoroalkyl ether structure may be used. Silicon-containing fluorine compounds with a perfluoroalkyl ether structure include, but are not limited to, $CF_3O(CF_2O)_6$—$CH_2CH_2$—$Si(OC_2H_5)_3$, $CF_3O(C_3F_6O)_4$—$CH_2CH_2$—$Si(OCH_3)_3$, $CF_3O(C_3F_6O)_2(CF_2O)_3$—$CH_2CH_2$—$Si(OCH_3)_3$, $CF_3O(C_3F_6O)_8$—$CH_2CH_2$—$Si(OCH_3)_3$, $CF_3O(C_4F_9O)_5$—$CH_2CH_2$—$Si(OCH_3)_3$, $CF_3O(C_4F_9O)_5$—$CH_2CH_2$—$Si(CH_3)(OC_2H_5)_2$, and $CF_3O(C_3F_6O)_4$—$CH_2CH_2$—$Si(C_2H_5)(OCH_3)_2$.

Some phosphorus-containing fluorine compounds may have a perfluoroalkyl structure. The perfluoroalkyl structure may be that of the compound described above or later herein. One example of the phosphorus-containing fluorine compound is represented by $P(O)R_n(OH)_{3-n}$. In this formula, n is an integer of 1 to 3, and R is a perfluoroalkyl group or structure. For example, such a phosphorus-containing fluorine compound may be 2-(perfluorohexyl)ethyl phosphonic acid.

The fluorine compound may be a fluorine-containing fatty acid, and examples thereof include $CF_3$—$CH_2CH_2$—$COOH$, $CF_3(CF_2)_3$—$CH_2CH_2$—$COOH$, $CF_3(CF_2)_5$—$CH_2CH_2$—$COOH$, $CF_3(CF_2)_6$—$CH_2CH_2$—$COOH$, $CF_3(CF_2)_7$—$CH_2CH_2$—$COOH$, and $CF_3(CF_2)_9$—$CH_2CH_2$—$COOH$ and their esters.

The fluorine compound may be a fluorine-containing isocyanate. The fluorine-containing isocyanate may be a compound represented by the following formula (1):

wherein $R^f$ represents $CF_3(CF_2)_m$— or $CF_3(CF_2)_m(CH_2)_l$—, m represents an integer of 2 to 18, and l represents an integer of 1 to 18.

Examples of the silane compound used for the surface treatment include tetramethoxysilane, tetraethoxysilane, tetrapropoxysilane, tetrabutoxysilane, tetraphenoxysilane, methyltrimethoxysilane, methyltriethoxysilane, ethyltrimethoxysilane, ethyltriethoxysilane, trimethoxyphenylsilane, triethoxyphenylsilane, vinyltrimethoxysilane, vinyltriethoxysilane, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane.

Other silane compounds may be used, and examples thereof include, but are not limited to, dimethyldimethoxysilane, diethyldiethoxysilane, 1-propenylmethyldichlorosilane, propyldimethylchlorosilane, propylmethyldichlorosilane, propyl trichlorosilane, propyltriethoxysilane, propyltrimethoxysilane, styrylethyltrimethoxysilane, tetradecyltrichlorosilane, 3-thiocyanatopropyltriethoxysilane, p-tolyldimethylchlorosilane, p-tolylmethyldichlorosilane, p-tolyltrichlorosilane, p-tolyltrimethoxysilane, p-tolyltriethoxysilane, di-n-propyldi-n-propoxysilane, diisopropyldiisopropoxysilane, di-n-butyldi-n-butyloxysilane, di-sec-butyldi-sec-butyloxysilane, di-t-butyldi-t-butyloxysilane, octadecyltrichlorosilane, octadecylmethyldiethoxysilane, octadecyltriethoxysilane, octadecyltrimethoxysilane, octadecyldimethylchlorosilane, octadecylmethyldichlorosilane, octadecylmethoxydichlorosilane, 7-octenyldimethylchlorosilane, 7-octenyltrichlorosilane, 7-octenyltrimethoxysilane, octylmethyldichlorosilane, octyldimethylchlorosilane, octyltrichlorosilane, 10-undecenyldimethylchlorosilane, undecyltrichlorosilane, vinyldimethylchlorosilane, methyldodecyldimethoxysilane, methyldodecyldiethoxysilane, methyloctadecyldimethoxysilane, methyloctadecyldiethoxysilane, n-octylmethyldimethoxysilane, n-octylmethyldiethoxysilane, triacontyldimethylchlorosilane, triacontyltrichlorosilane, methyltrimethoxysilane, methyltriethoxysilane, methyltri-n-propoxysilane, methyltriisopropoxysilane, methyltri-n-butyloxysilane, methyltri-sec-butyloxysilane, methyltri-t-butyloxysilane, ethyltrimethoxysilane, ethyltriethoxysilane, ethyltri-n-propoxysilane, ethyltriisopropoxysilane, ethyl-n-butyloxysilane, ethyltri-sec-butyloxysilane, ethyltri-t-butyloxysilane, n-propenyl tri methoxysilane, isobutyltrimethoxysilane, n-hexyltrimethoxysilane, hexadecyltrimethoxysilane, n-octyltrimethoxysilane, n-dodecyltriethoxysilane, n-octadecyltrimethoxysilane, n-propenyltriethoxysilane, isobutyltriethoxysilane, n-hexyltriethoxysilane, hexadecyltriethoxysilane, n-octyltriethoxysilane, n-dodecytrimethoxysilane, n-octadecyltriethoxysilane, 2-[2-(trichlorosilyl)ethyl]pyridine, 4-[2-(trichlorosiliyl)ethyl]pyridine, diphenyldimethoxysilane, diphenyldiethoxysilane, 1,3-(trichlorosilylmethyl)heptacosane, dibenzyldimethoxysilane, dibenzyldiethoxysilane, phenyltrimethoxysilane, phenyltrimethyldiethoxysilane, phenyldimethylmethoxysilane, phenyldimethoxysilane, phenyldiethoxysilane, phenylmethyldiethoxysilane, phenyldimethylethoxysilane, benzyltriethoxysilane, benzyltrimethoxysilane, benzylmethyldimethoxysilane, benzyldimethylmethoxysilane, benzyldimethoxysilane, benzyldiethoxysilane, benzylmethyldiethoxysilane, benzyldimethylethoxysilane, benzyltriethoxysilane, dibenzyldimethoxysilane, dibenzyldiethoxysilane, 3-acetoxypropyltrimethoxysilane, 3-acryloxypropyltrimethoxysilane, allyltrimethoxysilane, allyltriethoxysilane, 4-aminobutyltriethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, 6-(aminohexylaminopropyl)trimethoxysilane, p-aminophenyltrimethoxysilane, p-aminophenylethoxysilane, m-aminophenyltrimethoxysilane, m-aminophenylethoxysilane, 3-aminopropyltrimethoxysilane, 3-aminopropyltriethoxysilane, ω-aminoundecyltrimethoxysilane, amyltriethoxysilane, benzoxasilepin dimethyl ester, 5-(bicycloheptenyl)triethoxysilane, bis(2-hydroxyethyl)-3-aminopropyltriethoxysilane, 8-bromooctyltrimethoxysilane, bromophenyltrimethoxysilane, 3-bromopropyltrimethoxysilane, n-butyltrimethoxysilane, 2-chloromethyltriethoxysilane, chloromethylmethyldiethoxysilane, chloromethylmethyldiisopropoxysilane, p-(chloromethyl)phenyltrimethoxysilane, chloromethyltriethoxysilane, chlorophenyltriethoxysilane, 3-chloropropylmethyldimethoxysilane, 3-chloropropyltriethoxysilane, 3-chloropropyltrimethoxysilane, 2-(4-chlorosulfonylphenyl)ethyltrimethoxysilane, 2-cyanoethyltriethoxysilane, 2-cyanoethyltrimethoxysilane, cyanomethyl phenethyltriethoxysilane, 3-cyanopropyltriethoxysilane, 2-(3-cyclohexenyl)ethyltrimethoxysilane, 2-(3-cyclohexenyl)ethyltriethoxysilane, 3-cyclohexenyltrichlorosilane, 2-(3-cyclohexenyl)ethyltrichlorosilane, 2-(3-cyclohexenyl)ethyldimethylchlorosilane, 2-(3-cyclohexenyl)ethylmethyldichlorosilane, cyclohexyldimethylchlorosilane, cyclohexylethyldimethoxysilane, cyclohexylmethyldichlorosilane, cyclohexylmethyldimethoxysilane, (cyclohexylmethyl)trichlorosilane, cyclohexyltrichlorosilane, cyclohexyltrimethoxysilane, cyclooctyltrichlorosilane, (4-cyclooctenyl)trichlorosilane, cyclopentyltrichlorosilane, cyclopentyltrimethoxysilane, 1,1-diethoxy-1-silacyclopenta-3-ene, 3-(2,4-dinitrophenylamino)propyltriethoxysilane, (dimethylchlorosilyl)methyl-7,7-dimethylnorpinane, (cyclohexylaminomethyl)methyldiethoxysilane, (3-cyclopentadienylpropyl)triethoxysilane, N,N-diethyl-3-aminopropyl)trimethoxysilane, 2-(3,4-epoxycyclohexyl)ethyltrimethoxysilane, 2-(3,4-epoxycyclohexyl)ethyltriethoxysilane, (furfuryloxymethyl)triethoxysilane, 2-hydroxy-4-(3-triethoxypropoxy)diphenylketone, 3-(p-methoxyphenyl)propylmethyldichlorosilane, 3-(p-methoxyphenyl)propyltrichlorosilane, p-(methylphenethyl)methyldichlorosilane, p-(methylphenethyl)trichlorosilane, p-(methylphenethyl)dimethylchlorosilane, 3-morpholinopropyltrimethoxysilane, (3-glycidoxypropyl)methyldiethoxysilane, 3-glycidoxypropyltrimethoxysilane, 1,2,3,4,7,7-hexachloro-6-methyldiethoxysilyl-2-norbornene, 1,2,3,4,7,7-hexachloro-6-triethoxysilyl-2-norbornene, 3-iodopropyltrimethoxysilane, 3-isocyanatopropyltriethoxysilane, (mercaptomethyl)methyldiethoxysilane, 3-mercaptopropylmethyldimethoxysilane, 3-mercaptopropyldimethoxysilane, 3-mercaptopropyltriethoxysilane, 3-methacryloxypropylmethyldiethoxysilane, 3-methacryloxypropyltrimethoxysilane, methyl {2-(3-trimethoxysilylpropylamino)ethylamino}-3-propionate, 7-octenyltrimethoxysilane, R—N-α-phenethyl-N'-triethoxysilylpropylurea, S—N-α-phenethyl-N'-triethoxysilylpropylurea, phenethyltrimethoxysilane, phenethylmethyldimethoxysilane, phenethyldimethylmethoxysilane, phenethyldimethoxysilane, phenethyldiethoxysilane, phenethylmethyldiethoxysilane, phenethyldimethylethoxysilane, phenethyltriethoxysilane, (3-phenylpropyl)dimethylchlorosilane, (3-phenylpropyl)methyldichlorosilane, N-phenylaminopropyltrimethoxysilane, N-(triethoxysilylpropyl)dansylamide, N-(3-triethoxysilylpropyl)-4,5-dihydroimidazole, 2-(triethoxysilylethyl)-5-(chloroacetoxy)bicycloheptane, (S)—N-triethoxysilylpropyl-O-menthocarbamate, 3-(triethoxysilylpropyl)-p-nitrobenzamide, 3-(triethoxysilyl)propylsuccinic anhydride, N-[5-(trimethoxysilyl)-2-aza-1-oxopentyl]caprolactam, 2-(trimethoxysilylethyl)pyridine, N-(trimethoxysilylethyl)benzyl-N,N,N-trimethylammonium chloride, phenylvinyldiethoxysilane, 3-thiocyanatopropyltriethoxysilane, N-{3-(triethoxysilyl)propyl}phthalamidic acid, 1-(trimethoxysilyl-2-(chloromethyl)phenylethane, 2-(trimethoxysilyl)ethylphenylsulfonyl azide, β-trimethoxysilylethyl-2-pyridine, trimethoxysilylpropyldiethylenetriamine, N-(3-trimethoxysilylpropyl)pyrrole, N-trimethoxysilylpropyl-N,N,N-tributylammonium bromide, N-trimethoxysilylpropyl-N,N,N-tributylammonium chloride, N-trimethoxysilylpropyl-N,N,N-trimethylammonium chloride, vinylmethyldiethoxysilane, vinyltriethoxysilane, vinyltrimethoxysilane, vinylmethyldimethoxysilane, vinyldimethylmethoxysilane, vinyldimethylethoxysilane, vinylmethyldichlorosilane, vinylphenyldichlorosilane, vinylphenyldiethoxysilane, vinylphenyldimethylsilane, vinylphenylmethylchlorosilane, vinyltriphenoxysilane, vinyltris-t-butoxysilane, adamantylethyltrichlorosilane, allylphenyltrichlorosilane, (aminoethylaminomethyl)phenethyltrimethoxysilane, 3-aminophenoxydimethylvinylsilane, phenyltrichlorosilane, phenyldimethylchlorosilane, phenylmethyldichlorosilane, benzyltrichlorosilane, benzyldimethylchlorosilane, benzylmethyldichlorosilane, phenethyldiisopropylchlorosilane, phenethyltrichlorosilane, phenethyldimethylchlorosilane, phenethylmethyldichlorosilane, 5-(bicycloheptenyl)trichlorosilane, 5-(bicycloheptenyl)triethoxysilane, 2-(bicycloheptyl)dimethylchlorosilane, 2-(bicycloheptyl)trichlorosilane, 1,4-bis(trimethoxysilylethyl)benzene, bromophenyltrichlorosilane, 3-phenoxypropyldimethylchlorosilane, 3-phenoxypropyltrichlorosilane, t-butylphenylchlorosilane, t-butylphenylmethoxysilane, t-butylphenyldichlorosilane, p-(t-butyl)phenethyldimethylchlorosilane, p-(t-butyl)phenethyltrichlorosilane, 1,3-(chlorodimethylsilylmethyl)heptacosane, ((chloromethyl)phenylethyl)dimethylchlorosilane, ((chloromethyl)phenylethyl)methyldichlorosilane, ((chloromethyl)phenylethyl)trichlorosilane, ((chloromethyl)phenylethyl)trimethoxysilane, chlorophenyltrichlorosilane, 2-cyanoethyltrichlorosilane, 2-cyanoethylmethyldichlorosilane, 3-cyanopropylmethyldiethoxysilane, 3-cyanopropylmethyldichlorosilane, 3-cyanopropylmethyldichlorosilane, 3-cyanopropyldimethylethoxysilane, 3-cyanopropylmethyldichlorosilane, and 3-cyanopropyltrichlorosilane.

Such a fluorine or silane compound coats the pigment particles by the surface treatment. The surface-treated pigment particle can form more lustrous images. The surface treatment may use two or more compounds selected from the fluorine and silane compounds cited above.

The metallic pigment content of the metallic ink composition may be, by mass, 0.1% to 10.0%, for example, 0.5% to 8.0% or 1.0% to 5.0%.

(2) Other Constituents

The metallic ink composition may contain other constituents in addition to the metallic pigment.

Water

The metallic ink composition, even of solvent-based ink, may contain water. The water may be pure water or ultrapure water, such as ion-exchanged water, ultrafiltered water, reverse osmotic water, or distilled water. In some embodiments, the water is sterilized, for example, by irradiation with UV light or by adding hydrogen peroxide to prevent mold and bacterial development over a long period.

Organic Solvent

The metallic ink composition may contain a solvent. The solvent may be, but is not limited to, for example, a glycol ether represented by the following general formula (2):

$$R^1O-(R^2O)_m-R^3 \qquad (2)$$

wherein $R^1$ represents hydrogen or alkyl with 1 to 6 carbon atoms, $R^2$ represents alkylene with 2 to 4 carbon atoms, $R^3$ represents hydrogen, acetyl, or alkyl with 1 to 6 carbon atoms, either $R^1$ or $R^3$ or both are alkyl with 1 to 6 carbon atoms, and m represents an integer of 1 to 7.

Examples of the compounds represented by general formula (2) include glycol monoethers, such as methyl glycol, methyl diglycol, methyl triglycol, isopropyl glycol, isopropyl diglycol, butyl glycol, butyl diglycol, butyl triglycol, isobutyl glycol, isobutyl diglycol, hexyl glycol, hexyl diglycol, methyl propylene glycol, methyl propylene diglycol, methyl propylene triglycol, propyl propylene glycol, propyl propylene diglycol, butyl propylene glycol, butyl propylene diglycol, butyl propylene triglycol, and methyl propylene glycol acetate; and glycol diethers, such as dimethyl glycol, dimethyl diglycol, dimethyl triglycol, methyl ethyl diglycol, diethyl diglycol, dibutyl diglycol, and dimethyl propylene diglycol.

In some embodiments, $R^2$ or $R^3$, particularly $R^3$, of the organic solvent represented by general formula (2) is hydrogen or alkyl with 1 to 4 carbon atoms. Such an organic solvent can reduce unevenness in the printed image, increase luster, and form favorable dot sizes. Also, in an embodiment, the formula (2) solvent may be a glycol diether whose $R^1$ and $R^3$ are both alkyl from the viewpoint of rapidly drying printed items and enhancing the luster. In another embodiment, from the viewpoint of favorably spreading the ink to wet the printing medium, the formula (2) solvent may be a glycol monoether in which either $R^1$ or $R^3$ is hydrogen and the other is alkyl. From the viewpoint of rapidly drying printed items and stable printing, the formula (2) solvent may be an ethylene glycol monoether or diether whose $R^2$ is alkylene with 2 or 3 carbon atoms, particularly 2 carbon atoms.

In an embodiment, the metallic ink composition may contain an alkylene glycol ether or alkylene glycol ether ester, which is a type of glycol ether.

The alkylene glycol ether may be an alkylene glycol monoether or diether and may be an alkylene glycol alkyl ether. More specifically, examples of such alkylene glycol ethers include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Example of the alkylene glycol ether ester include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, and dipropylene glycol acetate propionate.

The metallic ink composition may contain a lactone. Lactones partially dissolve poorly absorbent printing media, such as vinyl chloride-based films because of cyclic lactones, enabling the ink composition to permeate the printing media. Such permeation of the ink composition enhances the rub resistance of the image printed on the printing medium.

Lactone is a general term for cyclic compounds having an ester group (—CO—O—) in the cyclic structure. The lactone is not particularly limited, as long as it is included in the definition described above, and lactones with 2 to 9 carbon atoms may be used. Examples of such a lactone include α-ethyllactone, α-acetolactone, β-propiolactone, γ-butyrolactone, δ-valerolactone, ε-caprolactone, ζ-enantiolactone, η-caprylolactone, γ-valerolactone, γ-heptalactone, γ-nonalactone, β-methyl-δ-valerolactone, 2-butyl-2-ethylpropiolactone, and α,α-diethylpropiolactone. In an embodiment, γ-butyrolactone may be used. Lactones may be used individually or in combination.

The metallic ink composition may further contain other organic solvents, such as esters, ketones, alcohols, amides, alkanediols, and pyrrolidone and its derivatives.

In an embodiment using a solvent-based metallic ink composition, the total organic solvent content may be 40% or more, for example, 50% or more, 60% or more, or 70% or more, relative to the total mass (100%) of the metallic ink composition, and the upper limit of the total organic solvent content may be 99% or less, for example, 98%.

In an embodiment using a water-based metallic ink composition, the total organic solvent content may be 5% or more, for example, 10% or more, 15% or more, or 20% or more, relative to the total mass (100%) of the ink composition, and the upper limit of the total organic solvent content may be 50% or less.

Surfactant

The metallic ink composition may contain a silicone surfactant, a fluorosurfactant, or a polyoxyethylene derivative acting as a nonionic surfactant, from the viewpoint of reducing the surface tension and thus increasing the wettability on the printing medium.

The silicone surfactant may be a polyester-modified or polyether-modified silicone. Examples of such a silicone surfactant include BYK-315, BYK-315N, BYK-347, BYK-348, BYK-UV3500, BYK-UV3510, BYK-UV3530, and BYK-UV3570 (all produced by BYK Japan KK).

The fluorosurfactant may be a fluorine-modified polymer, and examples thereof include BYK-340 (produced by BYK Japan KK); MEGAFACE series F-251, F-430, F-477, F-552, F-553, F-554, F-556, F-557, F-559, F-562, F-563, F-565, and R-40 (all produced by DIC Corporation); SURFLON series S-242, S-243, S-386, S-420, S-431, S-611, S-647, S-651, S-656, S-658, and S-693 (all produced by AGC Seimi Chemical Co., Ltd.); and FTERGENT series 251, 208M, 212M, 215M, 250, 209F, 222F, 245F, 208G, 218GL, 240G, 212P, 220P, 228P, FTX-218, and DFX-18 (all produced by NEOS COMPANY LIMITED).

The polyoxyethylene derivative may be an acetylene glycol-based surfactant. Examples of such a surfactant include SURFYNOL series 82, 104, 465, 485, and TG (all produced by Air Products and Chemicals Inc.); OLFINE series: STG and E1010 (both produced by Nissin Chemical Industry Co., Ltd.); NissanNonion series A-10R and A-13R (both produced by NOF Corporation); FLOWLEN series TG-740W and D-90 (both produced by Kyoeisha Chemical Co., Ltd.); and NOIGEN CX-100 (produced by DKS Co., Ltd.).

The surfactant may be an acetylene glycol-based surfactant or a polysiloxane-based surfactant. Acetylene glycol-based and polysiloxane-based surfactants can increase the wettability of the ink composition on the print side of the printing medium and facilitate the permeation of the ink composition into the printing medium. Acetylene glycol-based surfactants include, for example, 2,4,7,9-tetramethyl-5-decyn-4,7-diol, 3,6-dimethyl-4-octyn-3,6-diol, 3,5-dimethyl-1-hexyn-3-ol, and 2,4-dimethyl-5-hexyn-3-ol. Commercially available acetylene glycol-based surfactants may be used, and examples thereof include OLFINE series E1010, STG, and Y (all produced by Nissin Chemical Industry Co., Ltd.); and SURFYNOL series 104, 82, 465, 485, and TG (all produced by Air Products and Chemicals Inc.). Polysiloxane-based surfactants are also commercially available. For example, BYK-347 or BYK-348 (produced by BYK Japan KK) may be used. The metallic ink composition may contain other anionic, nonionic, or amphoteric surfactants.

In some embodiments, an acetylene glycol-based or polysiloxane-based surfactant is used as the surfactant. Acetylene glycol-based and polysiloxane-based surfactants can increase the wettability of the ink composition on the surface subjected to ink application and facilitate the permeation of the ink composition into the printing medium. Acetylene glycol-based surfactants include 2,4,7,9-tetramethyl-5-decyn-4,7-diol, 3,6-dimethyl-4-octyn-3,6-diol, 3,5-dimethyl-1-hexyn-3-ol, and 2,4-dimethyl-5-hexyn-3-ol. Commercially available acetylene glycol-based surfactants may be used, and examples thereof include OLFINE series E1010, STG, and Y (all produced by Nissin Chemical Industry Co., Ltd.); and SURFYNOL series 104, 82, 465, 485, and TG (all produced by Air Products and Chemicals Inc.). Polysiloxane-based surfactants are also commercially available. For example, BYK-347 or BYK-348 (produced by BYK Japan KK) may be used. The metallic ink composition may contain other anionic, nonionic, or amphoteric surfactants. Such surfactants include DISPERBYK 102 (produced by BYK Japan KK) and DISPARLON DA-325 (produced by Kusumoto Chemicals, Ltd.).

In an embodiment using a metallic ink composition containing a surfactant, the surfactant content may be, by mass, 0.05% to 3%, for example, 0.5% to 2%.

Resin

The metallic ink composition may contain resin (hereinafter referred to as fixing resin) to fix the metallic pigment to the printing medium.

Examples of the fixing resin include acrylic resin, rosin-modified resin, phenol resin, terpene resin, polyester resin, polyamide resin, epoxy resin, vinyl acetate resin, vinyl chloride resin, cellulose acetate butyrate and other textile fabric resins, and vinyl toluene-α-methylstyrene copolymers. In some embodiments, the fixing resin is at least one selected from the group consisting of acrylic resins and vinyl chloride resins. The metallic ink composition containing such a fixing resin can be firmly fixed to the printing medium and increase rub resistance of the printed image.

The fixing resin content in the metallic ink composition may be, by mass, 0.05% to 15%, for example, 0.1% to 10%. The fixing resin with such content can firmly fix the metallic pigment to poorly absorbent printing media.

The acrylic resin to be used may be produced by polymerization of known polymerizable monomers. Examples of such polymerizable monomers include acrylate esters, such as methyl acrylate, ethyl acrylate, isopropyl acrylate, n-butyl acrylate, and 2-ethylhexyl acrylate; methacrylate esters, such as methyl methacrylate, ethyl methacrylate, isopropyl methacrylate, n-butyl methacrylate, isobutyl methacrylate, t-butyl methacrylate, cyclohexyl methacrylate, and 2-ethylhexyl methacrylate; carboxy group-containing monomers, such as acrylic acid, methacrylic acid, maleic acid, fumaric acid, itaconic acid, mono-n-butyl maleate, mono-n-butyl fumarate, mono-n-butyl itaconate; and hydroxy-containing (meth)acrylate esters, amid group-containing monomers, glycidyl group-containing monomers, cyano group-containing monomers, hydroxy-containing allyl compounds, tertiary amino-containing monomers, and alkoxysilyl-containing monomers. Polymerizable monomers may be used individually or in combination. The acrylic resin may be a copolymer of acrylic monomers and other different monomers and may be a styrene-acrylic monomer. In an exemplary acrylic resin, the acrylic monomer content, by mass, accounts for 90% or more, 95% or more, or 99% or more of the total monomer content.

A commercially available acrylic resin may be used, and examples thereof include ACRYPET MF (acrylic resin produced by Mitsubishi Rayon Co., Ltd.), SUMIPEX LG (acrylic resin produced by Sumitomo Chemical Co., Ltd.), PARALOID B Series (acrylic resin produced by Rohm and Haas Company), PARAPET G-1000P (acrylic resin produced by Kuraray Co., Ltd.), and UC-3000 (acrylic resin produced by Toagosei Co., Ltd.). Acrylic monomers mentioned herein include (meth)acrylic monomers. (Meth) acrylic acid refers to either acrylic acid or methacrylic acid or both, and (meth)acrylate refers to either an acrylate or the corresponding methacrylate or both.

The metallic ink composition containing an acrylic resin can form more firmly fixed images.

The vinyl chloride resin used as the fixing resin may be a copolymer of vinyl chloride and other monomers such as vinyl acetate, vinylidene chloride, acrylic acid, maleic acid, or vinyl alcohols. An exemplary vinyl chloride resin is a vinyl chloride-vinyl acetate copolymer, which contains constitutional units derived from vinyl chloride and vinyl acetate. In some embodiments, vinyl chloride-vinyl acetate copolymers having glass transition temperatures of 60° C. to 80° C. may be used.

Vinyl chloride-vinyl acetate copolymers can be produced by a usual process, such as suspension polymerization. More specifically, the suspension polymerization may be conducted by adding vinyl chloride and vinyl acetate under pressure into a polymerization vessel charged with water, a dispersant, and a polymerization initiator, followed by degassing. Alternatively, the suspension polymerization may be conducted by adding vinyl acetate and a part of vinyl chloride into the vessel under pressure to start a reaction, followed by placing the rest of the vinyl chloride into the reacting vessel under pressure.

The vinyl chloride-vinyl acetate copolymer may contain 70% to 90% by mass of vinyl chloride units. The vinyl chloride-vinyl acetate copolymer with such content can dissolve consistently in the ink composition. Accordingly, the ink composition can be stable over a long storage period.

Also, such an ink composition can be consistently ejected and firmly fixed to printing media.

The vinyl chloride-vinyl acetate copolymer may optionally contain further constitutional units in addition to the vinyl chloride and vinyl acetate units. Examples of the further constitutional units include carboxylic units, vinyl alcohol units, and hydroxyalkyl acrylate units. Vinyl alcohol units are typical examples. Such constitutional units can be derived from their corresponding monomers. Examples of monomers forming carboxylic units include maleic acid, itaconic acid, maleic anhydride, itaconic anhydride, acrylic acid, and methacrylic acid. Examples of monomers forming hydroxyalkyl acrylate units include hydroxyethyl (meth) acrylate and hydroxyethyl vinyl ether. The monomers forming such constitutional units may be added in any proportion, provided that the concept of the present disclosure can be implemented. For example, such monomers may be subjected to copolymerization in a proportion of 15% or less to the total mass of all monomers.

A commercially available vinyl chloride-vinyl acetate copolymer may be used. Examples thereof include SOLBIN CN, SOLBIN CNL, SOLBIN CSR, SOLBIN TA5R, SOLBIN CL, and SOLBIN CLL (all produced by Nissin Chemical Industry Co., Ltd.).

The average polymerization degree of the fixing resin may be, but is not limited to, 150 to 1100, for example, 200 to 750. The fixing resin with an average polymerization degree in such a range can dissolve consistently in the metallic ink composition. Accordingly, the ink composition can be stable over a long storage period. Also, such an ink composition can be consistently ejected and firmly fixed to the printing medium. The average polymerization degree is determined by specific viscosity measurement and subsequent calculation, according to JIS K 6720-2.

The number average molecular weight of the fixing resin may be, but is not limited to, 10000 to 50000 or 12000 to 42000. The number average molecular weight can be measured by gel permeation chromatography (GPC) as a relative value in terms of polystyrene-equivalent.

Other Additives

The metallic ink composition may further contain other constituents, such as an ethylenediaminetetraacetic acid salt (EDTA salt) or any other chelating agent, a preservative, a viscosity modifier, a solubilizing agent, an antioxidant, and a fungicide, to impart desired properties.

In an embodiment using water-based inks, the metallic ink composition may contain a tertiary amine, an alkanediol, a polyhydric alcohol, a pyrrolidone derivative, a pH adjuster, a buffer solution, and other additives.

Tertiary amines can increase the dispersibility of the metallic pigment in water and the storage stability of the ink composition. Common tertiary amines include hydroxyamines, such as triethanolamine, tripropanolamine, tributanolamine, N,N-dimethyl-2-aminoethanol, and N,N-diethyl-2-aminoethanol. Triethanolamine and tripropanolamine are useful in increasing the dispersibility of the pigment in water. In particular, triethanolamine is useful in increasing the storage stability of the ink composition, as well as in increasing dispersibility in water.

The buffer solution is selected from the known buffer solutions that can control the pH of the metallic ink composition to 5.0 to 8.5. Examples of such a buffer solution include Good buffers such as 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid)(PIPES), N-(2-acetamido)-2-aminoethanesulfonic acid (ACES), Cholamine chloride, N,N-bis(2-hydroxyethyl)-2-aminoethanesulfonic acid (BES), N-tris(hydroxymethyl)methyl-2-aminoethanesulfonic acid (TES), acetamidoglycine, tricine, glycinamide, and vicine; phosphate buffers; and tris buffers.

Alkanediols can increase the wettability of the ink composition on the print side of the printing medium and facilitate the permeation of the ink composition into the printing medium. The alkanediol used in the metallic ink composition may be a 1,2-alkanediol with 4 to 8 carbon atoms, such as 1,2-butanediol, 1,2-pentanediol, 1,2-hexanediol, 1,2-heptanediol, and 1,2-octanediol. 1,2-hexanediol, 1,2-heptanediol, and 1,2-octanediol, containing 6 to 8 carbon atoms, are more useful in facilitating the permeation of the ink composition into the printing medium.

Polyhydric alcohols are useful in using the water-based ink compositions in ink jet printing apparatuses. In this instance, polyhydric alcohols can reduce excessive dry of and clogs with the water-based ink composition.

Examples of the pyrrolidone derivative include N-methyl-2-pyrrolidone, N-ethyl-2-pyrrolidone, N-vinyl-2-pyrrolidone, 2-pyrrolidone, and 5-methyl-2-pyrrolidone.

Examples of the pH adjuster include potassium dihydrogenphosphate, disodium hydrogenphosphate, sodium hydroxide, lithium hydroxide, potassium hydroxide, ammonia, diethanolamine, triethanolamine, triisopropanolamine, potassium carbonate, sodium carbonate, and sodium hydrogencarbonate.

1.1.2. Properties of Metallic Ink Composition

In an embodiment using a solvent-based metallic ink composition, the metallic ink composition contains 40.0% or more of glycol ether relative to the total mass of the ink composition. Such a solvent-based metallic ink composition can produce favorable printed items. The glycol ether content in the solvent-based metallic ink composition may be, by mass, 50% or more or 60% or more. The upper limit of the glycol ether content may be, but is not limited to, 99% or less.

In an embodiment, a glycol ether having a flash point of 70.0° C. or less may be used in a proportion of 40.0% or more to the total mass of the ink composition. Such a solvent-based metallic ink composition can produce more favorable printed items. The content of such a glycol ether may be, by mass, 50% to 99% or 60% to 90%.

For solvents whose flash point measured with a tag closed-cup flash point tester is higher than 80° C., the flash point is measured with a cleveland open-cup flash point tester. For solvents whose flash point measured with a tag closed-cup flash point tester is 80° C. or lower, the solvents are classified into two types: solvents having kinematic viscosities of less than 10 cSt at the flash point thereof; and solvents having kinematic viscosities of 10 cSt or more at the flash point thereof. The flash point of the former solvents is that measured with a tag closed-cup flash point tester. The flash point of the latter solvents is that measured with a SETA closed-cup flash point tester.

Examples of the glycol ether with a flash point of 70.0° C. or less include diethylene glycol methyl ethyl ether (64° C.), diethylene glycol dimethyl ether (56° C.), and dipropylene glycol dimethyl ether (65° C.)

The flash point of the glycol ether used in some embodiments may be 50° C. to 70° C., for example, 55° C. to 70° C., 60° C. to 70° C., or 62° C. to 68° C. Glycol ethers with a flash point of 70° C. or less help the ink composition dry rapidly, preventing color mixing, ink color transfer, and scrapes, increasing luster.

In an embodiment, a glycol ether with a flash point of more than 70° C. may be used. Examples of the glycol ether with a flash point of more than 70° C. include diethylene glycol diethyl ether (71° C.) and triethylene glycol monobutyl ether (156° C.)

The flash point of more than 70° C. of such a glycol ether may be 160° C. or less, for example, 120° C. or less. Glycol ethers with such a flash point increase the wettability of the ink composition on the printing medium.

The viscosity of the metallic ink composition may be 2 mPa·s to 15 mPa·s at 20° C. The metallic ink composition with a viscosity at 20° C. in such a range can be appropriately ejected through the nozzles with reduced scattering or deviation from the proper path of the ink droplets. Such a metallic ink composition is useful for use in ink jet printing apparatuses.

The metallic ink composition can be prepared by mixing the above-described constituents in a desired order and, optionally, removing impurities by, for example, filtration. For example, the constituents may be stirred and mixed in a container equipped with a stirring device, such as a mechanical stirrer or a magnetic stirrer.

1.2. Heating Step

The ink jet printing method disclosed herein also includes heating the metallic ink composition on the printing medium with an IR heater.

1.2.1. Infrared Heater (IR Heater)

For this heating, the metallic ink composition may be irradiated with infrared radiation, using an infrared (IR) heater in the ink jet printing apparatus described later herein. Any IR heater may be used, provided that IR radiation can reach the print side of the printing medium.

IR radiation used for the heating step heats the printing medium and images formed on the printing medium to remove volatile components from the images, thus drying the images.

Heating with the IR heater locally dries the ink composition at a position irradiated with IR radiation. Hence, the printing medium during being fed is not or slightly heated except for the portion irradiated with IR radiation. Therefore, the IR heater, even adjacent to the printing head, can be arranged not to irradiate with IR radiation the portion of the printing medium that has just received the ink composition ejected from the printing head. Thus, the ink composition immediately after being applied to the printing medium is kept from drying.

Using an IR heater in the heating step suppresses the drying of the metallic ink composition immediately after being applied to the printing medium. Accordingly, in an embodiment using a metallic ink composition containing flaky metallic pigment particles, the metallic pigment particles in the droplets that have just reached the printing medium can take a sufficient time for leafing.

The term leafing refers to a phenomenon in which flaky metallic pigment particles are deposited on a printing medium while aligning such that the normals of the pigment particles become nearly parallel to the normal of the printing medium. Sufficient leafing enables the printed image to develop excellent metallic luster. In contrast, insufficient leafing can result in poor luster in image because the normals of many particles do not align parallel to the normal of the printing medium. Leafing is likely to form when the ink composition that has been just applied onto the printing medium contains liquid. For example, when the liquid is dried or absorbed to the printing medium and decreases in viscosity, leafing is hindered. The heating step of the ink jet printing method disclosed herein is performed by IR irradiation. This facilitates leafing and thus provides images with high metallic luster.

Heating by IR irradiation is thermally efficient and reduces the likelihood of expansion and contraction of the printing medium by heating (hereinafter in some cases referred to as "damage to the printing medium" or "thermal deformation") while ensuring leafing time.

The heating step increases the printing medium surface temperature to, without particular limitation, 25° C. to 70° C., for example, 28° C. to 65° C., 30° C. to 60° C., or 32° C. to 58° C. Heating the printing medium surface to such temperatures can sufficiently dry the metallic ink composition, reducing color mixing when coloring ink compositions are applied.

The surface temperature of the printing medium can be measured with, for example, an IR sensor. The printing medium surface temperature in the heating step mentioned herein refers to the highest temperature at the surface of the printing medium during the heating step.

In an embodiment, the heating step heats the printing medium for a time that enables the portion that has received the metallic ink composition to keep temperatures of 28° C. or more for a period of 1 s to 120 s, for example, 3 s to 100 s, 10 s to 80 s, or 20 s to 60 s. Taking such a heating time can sufficiently dry the metallic ink composition, reducing color mixing. The heating time may be 30.0 s to 50 s or 40.0 s to 45 s. The heating time that enables the printing medium surface temperature to reach a temperature in the above ranges by heating with only the IR heater may be controlled within any of the above ranges.

The heating step may use any other heating device in addition to the IR heater. Examples of such an additional heating device include a preheater, a platen heater, and an after-heater. The preheater, platen heater, and after-heater may be of conduction type.

Additional heating with one or more conduction heaters in the heating step more rapidly dries the metallic ink and coloring ink compositions, further reducing color mixing of the ink compositions.

In an embodiment in which the heating step uses a preheater, the preheater is controlled not to excessively heat the printing medium when the metallic ink composition is applied. However, the preheater helps keep the printing medium at a specific temperature when the medium receives the metallic ink composition.

In an embodiment where the heating step uses a platen heater, as with the above, the platen heater is controlled not to excessively heat the printing medium when the medium receives the metallic ink composition. However, the platen heater helps keep the printing medium at a specific temperature when the medium receives the metallic ink composition. Also, using a platen heater under the conditions ensuring sufficient leafing helps the IR heater dry the ink composition.

The heating step may include moving the air around the printing medium with a blower. The blower may blow room-temperature air or warm (or hot) air. For example, warm air is blown on the printing medium. Combination with blowing air in the heating step further increases the efficiency of drying the metallic and coloring ink compositions.

1.3. Coloring Ink Application Step

In the coloring ink application step, a coloring ink composition containing a coloring material is ejected from an ink jet head onto the metallic ink composition on the printing medium.

1.3.1. Coloring Ink Composition

The coloring ink composition contains a coloring material.

(1) Coloring Material

The coloring material in the coloring ink composition colors the coating or image of the metallic ink composition into a colored metallic coating or image. The coloring material used herein adds a color other than the metallic color produced from the metallic ink to printed images. The coloring material may produce a chromatic color, or an achromatic color ranging from white to black through gray. In some embodiments, chromatic colors are selected. The coloring material may be a pigment or a dye. Organic pigments may be used because of storage stability in terms of resistance to light, weather, and gases. Process color inks, such as cyan, yellow, magenta, and black inks, may be used as the coloring ink composition.

Examples of the pigment used as the coloring material include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments. Such pigments may be used individually or in combination. More specific examples of the pigment include C.I. Pigment Yellows 1 (fast yellow G), 2, 3, 12 (disazo yellow AAA), 13, 14, 16, 17, 24, 34, 35, 37, 42 (yellow iron oxide), 53, 55, 73, 74, 75, 81, 83 (disazo yellow HR), 93, 94, 95, 97, 98, 100, 101, 104, 108, 109, 110, 117, 120, 128, 129, 138, 139, 150, 153, 154, 155, 180, 185, and 213; C.I. Pigment Reds 1, 2, 3, 5, 7, 17, 22 (brilliant fast scarlet), 23, 31, 38, 48:2 (permanent red 2B (Ba)), 48:2 (permanent red 2B (Ca)), 48:3 permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 101 (colcothar), 104, 105, 106, 112, 114, 122 (quinacridone magenta), 123, 146, 149, 166, 168, 170, 172, 177, 178, 179, 184, 185, 190, 193, 202, 209, and 219; C.I. pigment violet 19; C.I. Pigment Blues 1, 2, 15 (phthalocyanine blue R), 15:1, 15:2, 15:3 (phthalocyanine blue G), 15:4, 15:6 (phthalocyanine blue E), 16, 17:1, 22, 56, 60, and 63; and C.I. Pigment Greens 1, 4, 7, 8, 10, 17, 18, and 36. Pigments not designated by color indexes may be used.

In some embodiments using pigments as the coloring material, the coloring ink composition contains a dispersant to help the pigment disperse. The dispersant is selected from the dispersants that can be used in pigment inks, including cationic dispersants, anionic dispersants, nonionic dispersants, and surfactants.

Exemplary anionic dispersants include polyacrylic acids, polymethacrylic acids, acrylic acid-acrylonitrile copolymers, vinyl acetate-acrylate copolymers, acrylic acid-alkyl acrylate copolymers, styrene-acrylic acid copolymers, styrene-methacrylic acid copolymers, styrene-acrylic acid-alkyl acrylate copolymers, styrene-methacrylic acid-alkyl acrylate copolymers, styrene-α-methylstyrene-acrylic acid copolymers, styrene-α-methylstyrene-acrylic acid-alkyl acrylate copolymers, styrene-maleic acid copolymers, vinylnaphthalene-maleic acid copolymers, vinyl acetate-ethylene copolymers, vinyl acetate-fatty acid vinyl ethylene copolymers, vinyl acetate-maleate ester copolymers, vinyl acetate-crotonic acid copolymers, and vinyl acetate-acrylic acid copolymers.

Exemplary nonionic dispersants include polyvinylpyrrolidone, polypropylene glycol, and vinylpyrrolidone-vinyl acetate copolymers.

The surfactant used as the dispersant include anionic surfactants, such as sodium dodecylbenzenesulfonate, sodium laurate, and polyoxyethylene alkyl ether ammonium sulfates; and nonionic surfactants, such as polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamines. From the viewpoint of ensuring stable dispersion of the pigment, styrene-(meth)acrylic acid copolymers may be used.

In some embodiments, dyes may be used as the coloring material. Examples of such dyes include water-soluble dyes, such as acid dyes, direct dyes, reactive dyes, and basic dyes; and water-dispersible dyes, such as dispersible dyes, oil dyes, and sublimable dyes.

The above-cited coloring materials are merely examples and do not limit any embodiments of the disclosure. Coloring materials may be used individually or in combination, including combinations of pigments and dyes.

The coloring material content in the coloring ink composition can be determined as desired and may be, by mass, 0.10% to 20.0%, for example, 0.20% to 15.0% or 1.0% to 10.0%. In some embodiments, the coloring material content may be 1.5% to 5.0% by mass.

(2) Other Constituents

The coloring ink composition may further contain other constituents described above in "(2) Other Constituents" of "1.1.1. Metallic Ink Composition". The further constituents of the coloring ink composition include water, an organic solvent, a surfactant, a fixing resin, a chelating agent, a preservative, a viscosity modifier, a solubilizing agent, an antioxidant, a fungicide, a tertiary amine, an alkanediol, a polyhydric alcohol, a pyrrolidone derivative, a pH adjuster, and a buffer solution. The constituents including such additives and their contents are the same as described above, and thus description thereof is omitted.

1.3.2. Properties of Coloring Ink Composition

The coloring ink composition may be water-based or solvent-based. In an embodiment using a solvent-based coloring ink composition, the coloring ink composition contains 40.0% or more of glycol ether as described for the metallic ink composition, relative to the total mass of the ink composition. Such a solvent-based ink composition can produce favorable printed items.

In an embodiment, a glycol ether having a flash point of 70.0° C. or less, as described for the metallic ink composition, may be used in a proportion of 40.0% or more to the total mass of the ink composition. Such a solvent-based coloring ink composition can produce more favorable printed items.

The viscosity at 20° C. of the coloring ink composition may be 2 mPa·s to 10 mPa·s, for example, 3 mPa·s to 5 mPa·s. The coloring ink composition with such a viscosity at 20° C. can be appropriately ejected through the nozzles with reduced scattering or deviation from the proper path of the ink droplets. Such a coloring ink composition is useful for use in ink jet printing apparatuses.

The coloring ink composition can be prepared by mixing the above-described constituents in a desired order and, optionally, removing impurities by, for example, filtration. For example, the constituents may be stirred and mixed in a container equipped with a stirring device, such as a mechanical stirrer or a magnetic stirrer.

1.4. Ink Jet Printing Method

The ink jet printing method of an embodiment of the present disclosure forms images by driving one or more ink jet heads to eject droplets of the metallic ink composition and coloring ink composition onto a printing medium.

In an embodiment ejecting separately the metallic ink composition containing a metallic pigment and the coloring ink composition containing a coloring material, a metallic, lustrous image may first be formed with the metallic ink composition, and a colored image is then formed with the coloring ink composition.

The metallic pigment does not easily permeate the printing medium regardless of whether the medium has an ink-receiving layer, remaining on the printing medium. In contrast, the coloring material in the coloring ink composition ejected to a printing medium having an ink-receiving layer readily permeates the ink-receiving layer. Accordingly, by ejecting the metallic ink composition containing a metallic pigment onto a printing medium to form a metallic pigment layer and then applying the coloring ink composition onto the metallic pigment layer, the color of the coloring ink composition is sufficiently and favorably developed.

Some techniques for ejecting the metallic and coloring ink compositions will be described below.

A first technique uses electrostatic suction. In this instance, a strong electric field is applied between nozzles and an acceleration electrode disposed in front of the nozzles to continuously eject ink droplets from the nozzles. While the droplets fly, printing information signals are applied to deflection electrodes to deflect the ink droplets, thus printing images or the like. Alternatively, the ink droplets may be ejected according to printing information signals without being deflected.

A second technique forcibly ejects ink droplets by applying pressure to the ink compositions with a small pump and mechanically vibrating the nozzles with quartz resonators or the like. On ejecting ink droplets, the ink droplets are charged. While the droplets fly, printing information signals are applied to the deflection electrodes to deflect the ink droplets, thus printing images or the like.

A third technique uses piezoelectric elements. The piezoelectric elements simultaneously apply pressure and printing information signals to the ink composition to eject ink droplets, thus printing images or the like.

A fourth technique uses thermal energy to rapidly expand the ink volume. The ink composition is heated to bubble with small electrodes according to printing information signals, thus ejected to print images or the like.

Although all the above-described techniques, using ink jet heads, can be used in the ink jet printing method disclosed herein, in some embodiments, techniques of non-thermally ejecting ink compositions are used for high-speed printing. Hence, the first, second, and third techniques are beneficial for high-speed printing.

1.4.1. Ink Jet Printing Apparatus

The ink jet printing apparatus disclosed herein includes an ink jet head configured to eject the metallic ink composition, an infrared heater, and an ink jet head configured to eject the coloring ink composition.

This ink jet printing apparatus enables the coloring ink composition to be applied onto the metallic ink composition previously applied and heated to dry with the IR heater. In this instance, the coloring ink composition is applied onto the metallic ink composition in a sufficiently dry state to reduce color mixing of the metallic and coloring ink compositions, thus forming high-quality colored metallic images.

An embodiment of the ink jet printing apparatus will now be described with reference to the drawings. The ink jet printing apparatus facilitates the above-described metallic ink application step, heating step, coloring ink application step.

Figure 2:
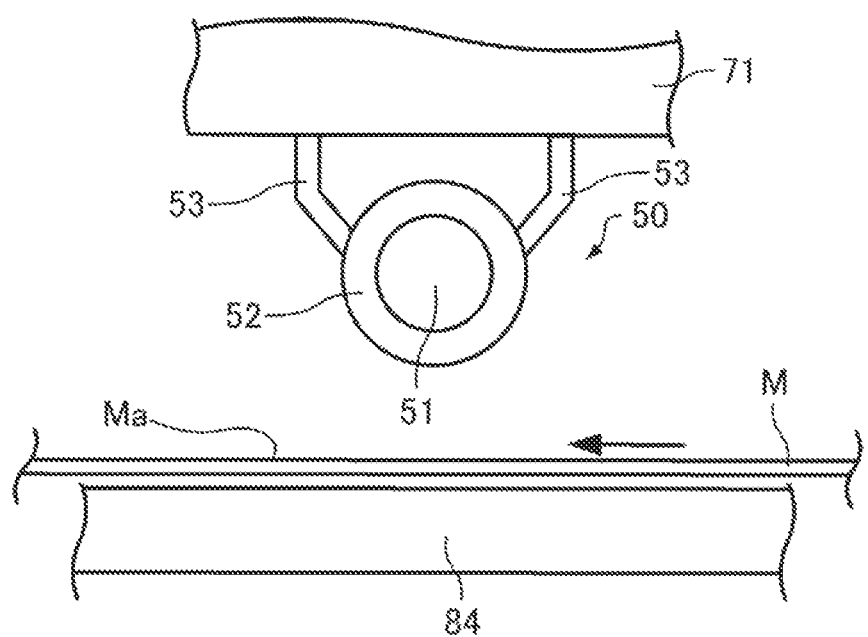
FIG. 2 is a schematic sectional view of an infrared (IR) heater.

FIG. 1 is a schematic sectional view of an ink jet printing apparatus 100. FIG. 2 is a schematic sectional view of an IR heater. The ink jet printing apparatus 100 includes printing heads 12 and 14, an infrared (IR) heater 50, a preheater 82, a front cover 32, a back cover 34, a platen heater 84, an after-heater 86, feed rollers 40, a supply roll 62, and a take-up roll 64. The general operation of the ink jet printing apparatus 100 is controlled by a control unit (not depicted). The IR heater 50 is used in the heating step.

The printing head 12 is disposed upstream of the other printing head 14 in the printing medium M feeding direction indicated by arrows in FIG. 1. The IR heater 50 lies between the printing heads 12 and 14.

The printing head 12 is configured to eject at least the metallic ink composition onto the printing medium M through the nozzles, thus printing images or the like on the medium M. The printing head 12 is a line head and prints specific images by applying the metallic ink composition onto the printing medium M moving relative to the printing head 12 by the rotation of the feed rollers 40. The printing head 12 is housed in an enclosure (not depicted).

The metallic ink composition is supplied to the printing head 12, for example, through or from a cartridge, a tube, or a tank. Ejection from the printing head 12 may be performed by a known technique. In the present embodiment, vibration of piezoelectric elements, that is, mechanical deformation of electrostrictive elements, is used for ejection.

The printing head 14 is configured to eject the coloring ink composition onto the printing medium M through the nozzles, thus printing images or the like on the medium M. The printing head 14 is a line head and prints specific images in a similar manner as the printing head 12 by applying the coloring ink composition onto the printing medium M moving relative to the printing head 14 by the rotation of the feed rollers 40. The printing head 14 is housed in an enclosure (not depicted).

In an embodiment, the printing heads 12 and 14 may be serial heads. In such a case, the printing heads are mounted on or in a carriage or respective carriages (not shown). While the carriage moves in one of the reciprocal main scanning directions (the directions perpendicular to the sheet of the drawings), the serial printing heads scan the printing medium for ejecting ink compositions onto the printing medium. Also, the printing medium is moved in the medium feeding direction for a sub-scan. Printing is performed by repeating plural times of the main scan and the sub-scan. The main scans and the sub-scans are alternately performed.

The coloring ink composition is supplied to the printing head 14, for example, through or from a cartridge, a tube, or a tank. In an embodiment, a plurality of cartridges or the like charged with different ink compositions may be used. The coloring ink composition is supplied to the nozzles of the printing head 14 from the cartridge or the like.

In the illustrated embodiment, the IR heater 50 is disposed between the printing heads 12 and 14. This arrangement enables the heating step of heating the metallic ink composition on the printing medium M ejected from the printing head 12. After the heating step, the printing head 14 ejects the coloring ink composition onto the metallic ink composition heated in the heating step.

The IR heater 50 may be located at any portion, including the illustrated position, provided that it can heat the metallic ink composition on the printing medium. For example, in an embodiment using serial printing heads, the IR heater 50 may be mounted on or in the carriage of either printing head 12 or 14. Alternatively, a single carriage may hold both the printing heads 12 and 14, and the carriage also holds the IR heater 50 together. The IR heater 50 may overlap with either the printing head 12 or 14 in the printing medium feeding direction or lie between the printing heads 12 and 14. The IR heater 50 may be disposed in or on the same carriage as the printing heads 12 and 14 and between the printing heads 12 and 14.

The IR heater 50 can heat the print side of the printing medium M that has received the metallic ink composition by emitting infrared radiation. This heating is unlikely to be affected by the thickness of the printing medium M compared to heating the rear side of the printing medium M. A fan (not depicted) may be provided for blowing warm air or ambient air to the printing medium M to dry the metallic and coloring ink compositions on the printing medium M. The IR heater 50 will be described in detail later herein.

The printing medium M used in the ink jet printing apparatus 100 is a long continuous medium fed from the supply roll 82 to the take-up roll 86. The printing medium M is fed by the feed rollers 40. Although the illustrated embodiment uses a set of feed rollers 40, any number of feed rollers 40 may be used for feeding the printing medium. The ink jet printing apparatus 100 may include a feed belt (not depicted).

The ink jet printing apparatus 100 may also include a preheater 82 to heat the printing medium M before reaching the position under the printing head 12. The preheater 82 is of conduction type. In the illustrated embodiment, the preheater 82 is configured to contact the rear side of the printing medium opposite the print side. The preheater 82 may be disposed to heat both sides of the printing medium M. The preheater 82 may be disposed downstream from the feed rollers 40 in the printing medium M feeding direction (indicated by arrows in the drawings), provided that it is located upstream of the printing head 12.

Heating the printing medium M with the preheater 82 enables the metallic ink composition to start drying immediately after the ink composition ejected from the printing head 12 has reached the printing medium M. Heating the printing medium M with the preheater 82 is an optional operation. Using the preheater 82 can keep the printing medium M at a specific temperature. When the printing medium M is heated by the preheater 82, the surface temperature of the printing medium M may be controlled to 40.0° C. or less, for example, 35° C. or less or 30° C. or less. Also, the surface temperature may be controlled to 28° C. or more or 30° C. or more. In this instance, the surface temperature to be controlled is the highest temperature of the portion that receives heat from the preheater 82. The preheater 82 refers to a heater located upstream of the platen in the printing medium feeding direction.

The ink jet printing apparatus 100 may further include a platen heater 84. The platen heater 84 is disposed at a position where the printing medium M opposes at least one of the printing head 12, the IR heater 50, and the printing head 14. In the illustrated embodiment, the platen heater 84 is disposed at a position where the printing medium M opposes all of the printing head 12, the IR heater 50, and the printing head 14. The platen 84 is a conduction heater. The platen heater 84 is configured to contact the rear side of the printing medium M opposite the print side. The conduction heater heats the printing medium M by heat conduction through a member in contact with the printing medium M. Furthermore, a blowing mechanism (not depicted) may be provided above the platen for heating by blowing.

The platen heater 84 enables the metallic ink composition to start drying immediately after the ink composition ejected from the printing head 12 has reached the printing medium M. Heating the printing medium M with the platen heater 84 is an optional operation. Heating with the platen heater 84 can stabilized the printing medium M temperature at a specific temperature.

When the platen region is heated with either a conduction heater such as the platen heater 84 or a blower heater or both, the surface temperature of the printing medium M may be controlled to 40.0° C. or less, for example, 35° C. or less or 30° C. or less. Also, the printing medium surface temperature may be controlled to 28° C. or more or 30° C. or more. Such temperature control prevents color mixing and scrapes and increases luster.

The platen heater 84 enables the metallic and coloring ink compositions to start drying immediately after the ink compositions ejected from the printing heads 12 and 14 have reached the printing medium M.

The IR heater 50, however, may heat the printing medium M to a surface temperature of 30° C. or more. For example, the surface temperature, in this instance, may be 35° C. or more, 40° C. or more, 45° C. or more, 50° C. or more, or 55° C. or more. The upper limit of the surface temperature may be 60° C. or less, for example, 50° C. or less. Such temperature control prevents color mixing and scrapes and increases luster.

The heating temperatures of the conduction and IR heaters are each the highest surface temperature of the portion of the printing medium that receives heat from the corresponding heater.

The ink jet printing apparatus 100 may further include an after-heater 86. The after-heater is a heating mechanism to sufficiently dry and solidify the ink compositions applied to the printing medium M to complete the printing of an image or the like. In other words, the after-heater is for secondary heating or drying. The after-heater is used in the post-application heating step described later herein. The after-heater is disposed downstream from the platen in the printing medium feeding direction.

The after-heater 86 can be used in the post-application heating step. As the after-heater 86 heats the printing medium M having a printed image thereon, water and other solvents in the image evaporate rapidly, causing the resin in the ink composition to form a film. The resin film fixes or adheres firmly to the printing medium M, forming a high-quality image in a short time. The upper limit of the surface temperature of the printing medium M heated with the after-heater 86 may be 120.0° C. or less, for example, 100.0° C. or 90.0° C. Also, the lower limit of the surface temperature of the printing medium M at this time may be 40° C. or more, for example, 45° C. or 50° C. By controlling the printing medium surface temperature in such a range, high-quality images can be formed in a short time. The surface temperature controlled in the post-application heating step is the highest temperature of the portion of the printing medium M that receives heat from the after-heater.

The ink jet printing apparatus 100 may include a cooling fan (not depicted). By cooling the ink composition on the printing medium M with the cooling fan after drying, the film of the ink composition can adhere more firmly to the printing medium M.

In the illustrated embodiment, the ink jet printing apparatus 100 includes a front cover 32 and a back cover 34. The front cover 32 and the back cover 34 are optionally provided to prevent the operator or user from coming into contact with interior members. The front cover 32 and the back cover 34 are openable and closable. The operations of the ink jet printing apparatus 100 are controlled by a control unit (not depicted).

1.4.2. IR Heater

FIG. 2 is a schematic sectional view of the IR heater 50, an example of the IR heater, viewed in a direction intersecting the printing medium M feeding direction. As illustrated in FIG. 2, the IR heater 50 includes a tube 52 extending in a direction intersecting the printing medium M feeding direction, a heating element 51 passing through the tube 52, and a holder 53 holding the tube 52. The tube 52 is made of a metal, for example, iron. In some embodiments, the overall length of the tube 52 in the printing medium M feeding direction is larger than the width of the printing medium M, which is the measurement of the printing medium M in a direction intersecting the printing medium M feeding direction. Thus, the IR heater can irradiate the entire image on the printing medium M passing under the tube 52 with infrared radiation.

The heating element 51, which generates heat by being electrified, is made of, for example, a heating wire, such as a nichrome wire. The heat from the heating element 51 heats the tube 52, thus emitting infrared radiation. Consequently, the water and other volatile components in the ink composition evaporate, causing the image to dry. The holder 53 is configured to hold the tube 52 from above. In the illustrated embodiment, an enclosure 71 holds the tube 52 with the holder 53. In the illustrated embodiment, the print side Ma of the printing medium M is irradiated with infrared radiation. On the rear side of the printing medium M, the platen heater 84 supports the printing medium M.

The tube 52 is heated to, for example, 300° C. to 700° C. The surface temperature of the heated printing medium M is, for example, 30.0° C. to 60.0° C. The surface temperature of at least a portion of the printing medium M may be controlled to 30.0° C. or more for a period of 1.0 s to 120.0 s or 20.0 s to 120.0 s by controlling the power of the IR heater 50 or the printing medium M feeding speed.

The surface temperature of the printing medium M can be measured with, for example, an infrared sensor.

The ink jet printing apparatus 100 described above facilitates the printing by the ink jet printing method of the present disclosure. The IR heater may be disposed any position without being limited to the position of the illustrated IR heater 50 of the ink jet printing apparatus 100, provided that the IR heater can dry the metallic ink composition to the extent that the coloring ink composition can be applied onto the layer of the metallic ink composition. For example, in an embodiment, the IR heater may be fixed downstream, in the printing medium M feeding direction (indicated by arrows in the drawings), from the printing head 12 that ejects the metallic ink composition.

The position of the printing head 14 that ejects the coloring ink composition is also not limited. In an embodiment providing a serial printing apparatus, for example, the printing head 14 may be arranged with the printing head 12 of the metallic ink composition side by side in a direction intersecting the printing medium M feeding direction (indicated by the arrows in the drawings). After receiving the metallic ink composition, the printing medium M is, for example, moved back upstream for applying the coloring ink composition onto the layer of the metallic ink composition.

1.5 Printing Medium

The ink jet printing method disclosed herein can print a variety of printing media including, but not limited to, plain paper, ink jet mad or glossy paper, glass sheets or plates, vinyl chloride and other plastic films, coated films whose substrate is coated with a plastic layer or an ink-receiving layer, metal sheets or plates, and printed circuit boards. Printing media having an ink-receiving layer may be printed without being heated from the viewpoint of avoiding thermal damage. In contrast, printing media not having an ink-receiving layer can be heated for rapid dry and high gloss.

1.6. Order of Process Steps

In the ink jet printing method disclosed herein, the coloring ink application step is performed after the metallic ink application step. In exemplary embodiments, the coloring ink application step applies the coloring ink composition onto the metallic ink composition heated in the heating step. Thus, the coloring ink application step may follow the heating step. Such a printing process reduces color mixing of the metallic ink composition and the coloring ink composition and facilitates the leafing of the metallic pigment particles.

1.7. Other Steps

The ink jet printing method disclosed herein may include a post-application heating step of heating the printing medium after the coloring ink application step. The post-application heating step is different from the above-described heating step using the IR heater. This step is intended to rapidly dry all the ink compositions on the printing medium by heating the printing medium.

The post-application heating step may use an after-heater described above. Alternatively, an infrared heater or any other heating mechanism may be used, and two or more heating mechanisms may be combined. Such a heating mechanism is not necessarily provided in the ink jet printing apparatus, and an external drying mechanism prepared outside the ink jet printing apparatus may be used.

In the embodiments including the post-application heating step, the printed item can be more rapidly dried, reducing the ink color transfer and scrapes of the printed item.

In the post-application heating step, the temperature of the printing medium is not particularly limited and, for example, may be controlled depending on the glass transition temperature Tg of the resin contained in the printed item. For example, the post-application heating step heats the printing medium to 30.0° C. to 120.0° C., for example, 40.0° C. to 100.0° C., 50.0° C. to 95.0° C., or 50° C. to 90.0° C.

1.8. Advantages

In the ink jet printing method described above, the heating step using the IR heater is performed after the metallic ink application step. Such a process facilitates sufficient leafing of the metallic pigment particles of the metallic ink composition, thus forming images with high metallic luster. Also, the metallic ink composition can be favorably dried to the extent that colors are unlikely to mix even though the coloring ink composition is applied onto the metallic ink composition, thus forming beautiful colored metallic images. Also, the coloring ink application step may be performed after the heating step. Such a step order reduces color mixing of the metallic ink composition and the coloring ink composition and facilitates the leafing of the metallic pigment particles.

In the metallic ink composition applied to the printing medium, leafing of the metallic pigment particles forms to develop a metallic luster in the image. However, when the metallic ink composition is dried immediately after being applied, leafing is hindered. In the ink jet printing method disclosed herein, the IR heater controls the heating step to reduce excessive drying, helping form imaged with high metallic luster.

However, when the coloring ink composition is applied onto the metallic ink composition that is not sufficiently subjected to the heating step, color mixing can occur. The heating step with an IR heater is effective in developing metallic luster and reducing color mixing. The IR heater can heat the metallic ink composition to the extent of reducing color mixing and allowing the metallic pigment to develop metallic luster. This is probably because the IR heater can mildly dry the applied ink composition, including the inside.

The platen heater can strongly dry the printing medium and thus heat the entire printing medium. Accordingly, the metallic ink composition starts drying immediately after reaching the printing medium, resulting in a shortage of leafing time. In the ink jet printing method using an IR heater, the temperature of the printing medium that has just received the metallic ink composition is not high. Accordingly, leafing can form sufficiently. Securing a sufficient leafing time, the IR heater starts heating for rapid drying.

2. Examples and Comparative Examples

The inventive concept of the present disclosure will now be specifically described with reference to the following Examples. However, the implementation of the inventive concept is not limited to the disclosed Examples. In the following description, "part(s)" and "%" are on a mass basis unless otherwise specified. The tests for evaluation were conducted at 25.0° C. and 40.0% in relative humidity.

2.1. Preparation of Metallic Pigments

A 20 μm-thick polyethylene terephthalate (PET) base film was coated with a cellulose acetate butyrate (CAB) resin in an acetone-soluble state with a roll coater. The CAB-coated PET film was fed into an Aluminum (Al) vacuum deposition machine at a speed of 5 m/s, and an Al layer was formed to a thickness of 17 nm or 28 nm on the CAB-coated PET film (CAB/PET film) under a pressure of $4\times10^{-3}$ kPa. The resulting Al/CAB/PET film was immersed in an acetone bath and irradiated with ultrasonic waves of 40 kHz or less to separate an Al pigment removed from the PET base film. After removing acetone by centrifugation, an amount of diethylene glycol diethyl ether (DEDG) was added, and the Al pigment was pulverized by irradiation with ultrasonic waves of 40 kHz or less. Then, an amount of DEDG was further added to yield a metallic pigment suspension containing 6% of flaky Al particles.

Subsequently, 2-(perfluorohexyl)ethyl phosphonic acid (FHP-2-OH) or 1H,1H,2H,2H-perfluorodecyltriethoxysilane was added to the resulting suspension in a proportion presented in Table 1. The Al particles in the suspension were thus surface-treated at a liquid temperature of 55° C. for 3 hours by irradiation with ultrasonic waves of 40 kHz or less. After the surface treatment, DisparBYK-102 was added, followed by mixing to yield a metallic pigment dispersion liquid.

2.2. Preparation of Ink Compositions

All the constituents were mixed in proportions presented in Table 1 by stirring with a magnetic stirrer for 2 hours, and the mixture was then filtered through a membrane filter of 5.0 μm in pore size. Thus, metallic ink compositions M1 to M6 and coloring ink compositions C1 and C2 were obtained. The figures in Table 1 are percentages by mass relative to the total mass (100%) of the corresponding ink composition.

TABLE 1

| | Ink | M1 | M2 | M3 | M4 | M5 | M6 | C1 | C2 |
|---|---|---|---|---|---|---|---|---|---|
| Metal particles | Al particles 1 | 1.5 | 1.5 | — | 1.5 | 1.5 | 1.5 | — | — |
| | Al particles 2 | — | — | 1.5 | — | — | — | — | — |
| Solvent | DEDG | 89.8 | 30.8 | 89.8 | 89.8 | 89.8 | 89.9 | 90.2 | 31.2 |
| | MEDG | — | 59.0 | — | — | — | — | — | 59.0 |
| | BTG-H | 8.0 | 8.0 | 8.0 | 8.0 | 8.0 | 8.0 | 8.0 | 8.0 |
| Surface treatment agent | Fluoroalkyl organophosphorus compounds | 0.1 | 0.1 | 0.1 | — | 0.1 | — | — | — |
| | Fluoroalkylsilane | — | — | — | 0.1 | — | — | — | — |
| Dispersant | DisparBYK-102 | 0.3 | 0.3 | 0.3 | 0.3 | 0.3 | 0.3 | — | — |
| Fixing agent | UC-3000 | 0.3 | 0.3 | 0.3 | 0.3 | — | 0.3 | — | — |
| | Vinyl chloride-vinyl acetate resin | — | — | — | — | 0.3 | — | 0.3 | 0.3 |
| Coloring agent | P.Y.155 | — | — | — | — | — | — | 1.5 | 1.5 |
| | Total | 100.0 | 100.0 | 100.0 | 100.0 | 100.0 | 100.0 | 100.0 | 100.0 |

In Table 1, Al particles 1 are 17 nm-thick leaf-shaped particles with a D50 particle size of 0.5 μm; Al particles 2 are 28 nm-thick leaf-shaped particles with a D50 particle size of 0.7 μm; the fluoroalkyl organophosphorus compound is FHP-2-OH available from Unimatec; and the Fluoroalkylsilane is 1H,1H,2H,2H-perfluorodecyltriethoxysilane available from Sigma-Aldrich. The D50 particle size representing a volume average particle size was measured with MT-3300 manufactured by MicrotracBEL. The thickness, or average thickness, of the particles was measured as described above.

In Table 1, DEDG represents diethylene glycol diethyl ether; MEDG, diethylene glycol methyl ethyl ether; and BTG-H, butyl triglycol.

DisparBYK-102 is a dispersant produced by BYK Japan KK; UC-3000 is an acrylic resin (fixing resin) produced by Toagosei Co., Ltd.; vinyl chloride-vinyl acetate resin is a vinyl chloride-vinyl acetate copolymer SOLBIN CL produced by Nissin Chemical Industry Co., Ltd. Coloring agent P.Y 155 is C.I. Pigment Yellow 155. Also, a dispersant was used in a proportion of 50% to the pigment, followed by adjusting the total amount with DEDG.

2.3. Evaluation Tests
2.3.1. Printing Test Machine

For evaluation tests, a printer modified from SC-S606850 manufactured by Seiko Epson was prepared. The test machine was provided with an IR heater between a printing head 12 for ejecting the metallic ink composition and a printing head 14 for ejecting the coloring ink composition 14 with gaps equal to one head from the respective heads, as described with reference to FIG. 1. The printing heads had a nozzle density of 300 dpi. The printing head 12, the IR heater 50, and the printing head 14 were arranged in this order in the printing medium feeding direction and mounted in the same carriage. Thus, the test machine was prepared as a serial printing apparatus. For each application of the metallic and coloring ink compositions, the head passed across the printing medium four times.

In each Examples presented in Tables 2 and 3, the amount of the metallic ink composition applied to the printing medium was 7.0 mg/inch$^2$, and the amount of the coloring ink composition applied to the printing medium was 3.5 mg/inch$^2$. The coloring ink composition was applied onto the metallic ink composition to form a yellow metallic image.

The IR heater, the preheater, the platen heater, and the after-heater arranged as illustrated in FIG. 1 were preset to heat the printing medium surface to temperatures presented in Tables 2 and 3. More specifically, the temperatures presented in the Tables for each heater represent the highest surface temperature at the heated portion of the printing medium when the corresponding heater heats the printing medium by itself. The heater was preset to the values presented in the Tables before printing. Therefore, the temperature of the heated portion decreases to room temperature when the portion leaves the heater by feeding the printing medium.

The printed samples ejected from the printer were tested as described below. The printing medium used was a polyvinyl chloride film, Scotchcal Graphic Film IJ8150 (manufactured by 3M).

2.3.2. Color Mixing

Each colored metallic image was visually checked for color mixing in the coloring ink on the metallic ink layer of the colored metallic image. Samples were evaluated according to the following criteria, and the results are presented in Tables 2 and 3.

A: The color was clear yellow metallic.
B: The color was slightly grayish yellow metallic.
C: The color was considerably grayish yellow metallic.

2.3.3. Luster

The glossiness of each colored metallic image was measured at a tilt angle of 20° with a glossmeter MINOLTA MULTI GLOSS 268. Samples were evaluated according to the following criteria, and the results are presented in Tables 2 and 3.

A: The measured glossiness was 600 or more.
B: The measured glossiness was 500 to less than 600.
C: The measured glossiness was 400 to less than 500.
D: The measured glossiness was less than 400.

2.3.4. Ink Color Transfer

In each Example, 10 cm×10 cm pattern images were continuously printed at intervals of 1 cm on the printing medium in a roll. Then, another printing medium of the same type was covered over the printed side of the printing medium, and a load of 5 kgf/cm$^2$ was placed thereon with a blocking tester, permanent strain tester CO-201 manufactured by Tester Sangyo, followed by leaving the sample at 25° C. and 50% RH for 10 hours. Then, the degree of adhesion between the printing media was examined and evaluated according to the following criteria. The results are presented in Tables 2 and 3.

A: No adhesion
B: Slight adhesion was exhibited, but the ink color was not transferred.
C: The ink color was transferred, but the ink coating did not peel.
D: The ink coating peeled.

TABLE 2

|  |  | Example 1 | Example 2 | Example 3 | Example 4 | Example 5 | Example 6 | Example 7 |
|---|---|---|---|---|---|---|---|---|
| Metallic ink composition | | M1 | M1 | M1 | M1 | M1 | M1 | M2 |
| Coloring ink composition | | C1 | C1 | C1 | C1 | C1 | C1 | C1 |
| Preset temperature (° C.) for heating printing medium surface | IR heater | 50 | 50 | 50 | 50 | 50 | 50 | 50 |
| | Preheater | 30 | 30 | 30 | 40 | 40 | 40 | 30 |
| | Platen heater | 30 | 30 | 30 | 40 | 40 | 40 | 30 |
| | After-heater | — | 40 | 50 | — | 40 | 50 | — |
| Evaluation | Color mixing | A | A | A | A | A | A | A |
| | Luster | A | A | A | B | B | B | C |
| | Ink color transfer | C | B | A | C | B | A | A |

|  |  | Example 8 | Example 9 | Example 10 | Example 11 | Example 12 | Example 13 |
|---|---|---|---|---|---|---|---|
| Metallic ink composition | | M2 | M1 | M1 | M1 | M1 | M2 |
| Coloring ink composition | | C2 | C1 | C1 | C1 | C1 | C1 |
| Preset temperature (° C.) for heating printing medium surface | IR heater | 50 | 40 | 30 | 60 | 50 | 50 |
| | Preheater | 30 | 40 | 40 | 30 | — | — |
| | Platen heater | 30 | 40 | 40 | 30 | — | — |
| | After-heater | — | — | — | 40 | 50 | 50 |
| Evaluation | Color mixing | A | B | B | A | B | A |
| | Luster | C | B | A | B | A | B |
| | Ink color transfer | A | C | C | B | A | A |

TABLE 3

|  |  | Example 14 | Example 15 | Example 16 | Example 17 | Example 18 | Comparative Example 1 |
|---|---|---|---|---|---|---|---|
| Metallic ink composition | | M1 | M3 | M4 | M5 | M6 | M1 |
| Coloring ink composition | | C2 | C1 | C1 | C1 | C1 | C1 |
| Preset temperature (° C.) for heating printing medium surface | IR heater | 50 | 50 | 50 | 50 | 50 | — |
| | Preheater | — | 30 | 30 | 30 | 30 | 30 |
| | Platen heater | — | 30 | 30 | 30 | 30 | 30 |
| | After-heater | 50 | 50 | 50 | 50 | 50 | — |
| Evaluation | Color mixing | A | A | A | A | A | C |
| | Luster | A | B | B | B | C | A |
| | Ink color transfer | A | A | A | B | B | D |

|  |  | Comparative Example 2 | Comparative Example 3 | Comparative Example 4 | Comparative Example 5 | Comparative Example 6 | Comparative Example 7 |
|---|---|---|---|---|---|---|---|
| Metallic ink composition | | M1 | M1 | M1 | M1 | M2 | M2 |
| Coloring ink composition | | C1 | C1 | C1 | C1 | C1 | C1 |
| Preset temperature (° C.) for heating printing medium surface | IR heater | — | — | — | — | — | — |
| | Preheater | 30 | 30 | 40 | 40 | 30 | 50 |
| | Platen heater | 30 | 30 | 40 | 40 | 30 | 50 |
| | After-heater | 40 | 50 | — | 40 | — | — |
| Evaluation | Color mixing | C | C | C | C | C | C |
| | Luster | A | A | B | B | c | D |
| | Ink color transfer | B | A | D | B | D | C |

2.4. Evaluation Results

All the Examples of the ink jet printing method according to the present disclosure, which included the metallic ink application step, the heating step of heating the metallic ink composition with an IR heater, and the coloring ink application step, produced satisfactory yellow metallic images with no color mixing. The Examples also produced high luster and prevented ink color transfer. In contrast, the Comparative Examples not using an IR heater exhibited significant color mixing.

The subject matter disclosed herein can be implemented in substantially the same manner as any of the disclosed embodiments (for example, in terms of function, method, and results, or in terms of purpose and effect). Some elements used in the disclosed embodiments but not essential may be replaced. Implementations capable of producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

The following can be derived from the above-described embodiments and modifications.

The ink jet printing method according to an aspect includes a metallic ink application step of ejecting a metallic ink composition containing a metallic pigment from an ink jet head to apply the metallic ink composition onto a printing medium, a heating step of heating the metallic ink composition applied on the printing medium with an infrared heater, and a coloring ink application step of ejecting a coloring ink composition containing a coloring material from an ink jet head to apply the coloring ink composition onto the metallic ink composition on the printing medium. Each of the metallic ink composition and the coloring ink composition is a water-based ink or a solvent-based ink.

In the ink jet printing method, the heating step using the IR heater may be performed after the metallic ink application step. Such a process facilitates the leafing of the metallic pigment of the metallic ink composition, thus producing images with high metallic luster. Also, the metallic ink composition can be favorably dried to the extent that colors are unlikely to mix even though the coloring ink composition is applied onto the metallic ink composition, thus forming beautiful colored metallic images.

In the ink jet printing method, the metallic pigment may be formed of flaky particles.

The ink jet printing method of the present disclosure can produce printed items with high metallic luster.

The metallic ink composition and the coloring ink composition may be solvent-based inks, and each ink composition contains glycol ether in a proportion of 40.0% or more to the total mass of the ink composition.

The ink jet printing method using solvent-based inks can produce more satisfactory printed items.

The metallic ink composition and the coloring ink composition each may contain a glycol ether with a flash point of 70.0° C. or less in a proportion of 40.0% or more to the total mass of the ink composition.

The ink jet printing method using such solvent-based inks can produce still more satisfactory printed items.

In the ink jet printing method, the metallic ink Composition may contain an acrylic resin.

The ink jet printing method using such a metallic ink composition can form firmly fixed images.

In the ink jet printing method, the metallic pigment may be surface-treated with a fluorine compound or a silane compound.

The ink jet printing method using such a metallic ink composition can form highly lustrous images.

The surface temperature of the printing medium in the heating step may be 30.0° C. to 60.0° C.

Such an ink jet printing method facilitates favorable leafing of the metallic pigment, producing highly lustrous images.

The heating step may include heating with a conduction heater.

Such additional heating more rapidly dries the metallic ink composition, further reducing color mixing of the ink compositions.

The ink jet printing method disclosed herein may include a post-application heating step performed after the coloring ink application step.

The post-application heating reduces ink color transfer and scrapes of the printed item.

In the ink jet printing method disclosed herein, the coloring ink application step applies the coloring ink composition onto the metallic ink composition heated by the heating step.

Such an ink jet printing method reduces color mixing of the metallic ink composition and the coloring ink composition and facilitates the leafing of the metallic pigment particles.

The ink jet printing apparatus according to another aspect includes an ink jet head configured to eject the metallic ink composition, an infrared heater, and an ink jet head configured to eject the coloring ink composition.

This ink jet printing apparatus can apply the coloring ink composition onto the metallic ink composition that has been previously applied and heated to dry with the infrared heater. In this instance, the coloring ink composition is applied onto the metallic ink composition in a sufficiently dry state to reduce color mixing of the metallic and coloring ink compositions, thus forming high-quality colored metallic images.

What is claimed is:

1. An ink jet printing method comprising:
a metallic ink application step of ejecting a metallic ink composition containing a metallic pigment from a first ink jet head to apply the metallic ink composition onto a printing medium;
a heating step of heating the metallic ink composition applied on the printing medium with an infrared heater, the infrared heater being disposed above a print side of the printing medium; and
a coloring ink application step of ejecting a coloring ink composition containing a coloring material from a second ink jet head to apply the coloring ink composition onto the metallic ink composition on the printing medium,
wherein each of the metallic ink composition and the coloring ink composition is a water-based ink or a solvent-based ink,
in the heating step, the infrared heater irradiates the print side of the printing medium with infrared radiation,
in the heating step, an organic solvent or water contained in the metallic ink composition is evaporated by heating by the infrared heater,
the infrared heater, the first ink jet head, and the second ink jet head are each mounted in a same carriage, and the infrared heater is positioned between the first ink jet head and the second ink jet head, and
the coloring ink composition is applied onto the metallic ink composition that is heated in the heating step.

2. The ink jet printing method according to claim 1, wherein
the metallic pigment is formed of flaky particles.

3. The ink jet printing method according to claim 1, wherein
the metallic ink composition and the coloring ink composition are solvent-based inks, and each ink composition contains glycol ether in a proportion of 40.0% or more to a total mass of the ink composition.

4. The ink jet printing method according to claim 3, wherein
the metallic ink composition and the coloring ink composition each contain a glycol ether with a flash point of 70.0° C. or less in a proportion of 40.0% or more to a total mass of the ink composition.

5. The ink jet printing method according to claim 1, wherein
the metallic ink composition contains an acrylic resin.

6. The ink jet printing method according to claim 1, wherein the metallic pigment is surface-treated with a fluorine compound or a silane compound.

7. The ink jet printing method according to claim 1, wherein
a surface temperature of the print side of the printing medium in the heating step is 30.0° C. to 60.0° C.

8. The ink jet printing method according to claim 1, wherein
the heating step includes heating with a conduction heater.

9. The ink jet printing method according to claim 1, further comprising:
a post-application heating step performed after the coloring ink application step.

10. The ink jet printing method according to claim 1, wherein
the coloring ink application step applies the coloring ink composition onto the metallic ink composition heated by the heating step.

11. An ink jet printing apparatus for printing by the ink jet printing method as set forth in claim 1, the apparatus comprising:
an ink jet head configured to eject the metallic ink composition as set forth in claim 1;
an infrared heater; and
an ink jet head configured to eject the coloring ink composition as set forth in claim 1.

12. The ink jet printing method according to claim 1, further comprising a pre-heating step of heating the printing medium with a pre-heater before the metallic ink application step.

13. The ink jet printing method according to claim 12, further comprising a post-heating step of heating the printing medium including each of the metallic ink and the coloring ink.

* * * * *